United States Patent
Vidal Calleja et al.

(10) Patent No.: US 9,547,807 B2
(45) Date of Patent: Jan. 17, 2017

(54) IMAGE PROCESSING AND OBJECT CLASSIFICATION

(71) Applicant: THE UNIVERSITY OF SYDNEY, Sydney (AU)

(72) Inventors: Teresa Vidal Calleja, Erskineville (AU); Rishi Ramakrishnan, Cherrybrook (AU)

(73) Assignee: The Univeristy of Sydney, New South Whales (AU)

( * ) Notice: Subject to any disclaimer, the term of this patent is extended or adjusted under 35 U.S.C. 154(b) by 32 days.

(21) Appl. No.: 14/352,879

(22) PCT Filed: Oct. 19, 2012

(86) PCT No.: PCT/AU2012/001277
§ 371 (c)(1),
(2) Date: Apr. 18, 2014

(87) PCT Pub. No.: WO2013/056315
PCT Pub. Date: Apr. 25, 2013

(65) Prior Publication Data
US 2014/0254923 A1    Sep. 11, 2014

(30) Foreign Application Priority Data
Oct. 19, 2011  (AU) .............................. 2011904325

(51) Int. Cl.
| | | |
|---|---|---|
| G06K 9/62 | (2006.01) | |
| G06F 17/30 | (2006.01) | |
| G06K 9/46 | (2006.01) | |

(52) U.S. Cl.
CPC ......... *G06K 9/6282* (2013.01); *G06F 17/3025* (2013.01); *G06F 17/30262* (2013.01);
(Continued)

(58) Field of Classification Search
CPC .. G06K 9/6276; G06K 9/6226; G06K 9/4676; G06F 17/30262; G06F 17/3025
See application file for complete search history.

(56) References Cited

U.S. PATENT DOCUMENTS 6,993,185 B2 * 1/2006 Guo et al. ..................... 382/176
7,725,484 B2 * 5/2010 Nister et al. .................. 707/763
(Continued)

FOREIGN PATENT DOCUMENTS

EP    2 154 631 A2    2/2010

OTHER PUBLICATIONS

Benkhalifa, M., Mouradi, A. and Bouyakhf, H. (2001), Integrating WordNet knowledge to supplement training data in semi-supervised agglomerative hierarchical clustering for text categorization. Int. J. Intell. Syst., 16: 929-947. doi: 10.1002/int.1042.*
(Continued)

*Primary Examiner* — Siamak Harandi
*Assistant Examiner* — Kate R Duffy
(74) *Attorney, Agent, or Firm* — Buchanan Ingersoll & Rooney PC

(57) ABSTRACT

A method for classifying objects from one or more images comprising generating a trained classification process and using the trained classification process to classify objects in the images. Generating the trained classification process can include extracting features from one or more training images and clustering the features into one or more groups of features termed visual words; storing data for each of the visual words, including color and texture information, as descriptor vectors; and generating a vocabulary tree to store clusters of visual words with common characteristics. Using the trained classification process to classify objects can include extracting features from the images and clustering the features into groups of features termed visual words;
(Continued)

searching the vocabulary tree to determine the closest matching clusters of visual words; and classifying objects based on the closest matching clusters of visual words in the vocabulary tree.

6 Claims, 9 Drawing Sheets

(52) U.S. Cl.
CPC ......... *G06K 9/4676* (2013.01); *G06K 9/6226* (2013.01); *G06K 9/6276* (2013.01)

(56) References Cited

U.S. PATENT DOCUMENTS

| 8,489,627 B1* | 7/2013 | Brandt | ............... 707/765 |
| 2010/0040285 A1 | 2/2010 | Csurka et al. | |

OTHER PUBLICATIONS

Wang, X., Yang, M., Cour, T., Zhu, S., Yu, K., Han, T.X.: Contextual weighting for vocabulary tree based image retrieval. In: ICCV. (2011), pp. 1-8. Accessed Aug. 22, 2016 at http://ieeexplore.ieee.org/xpls/icp.jsp?arnumber=6126244.*

Nister, D. et al., "Scalable Recognition With a Vocabulary Tree", Computer Vision and Patent Recognition, Department of Computer Science, University of Kentucky, (8 pages) (2006).

Bosch, A. et al, "Scene Classification Using a Hybrid Generative/Discriminative Approach", IEEE Transactions on Pattern Analysis and Machine Intelligence, vol. 30, No. 4, pp. 712-727 (Apr. 2008).

Lowe, D. G, "Distinctive Image Features From Scale-Invariant Keypoints", International Journal of Computer Vision, vol. 60, No. 2, pp. 91-110 (2004).

Pass, G. et al., "Comparing Images Using Joint Histograms", Multimedia System, pp. 1-15 (1999).

"Chapter 20. An Example Inference Task: Clustering", Information Theory, Inference and Learning Algorithms, Cambridge University Press, pp. 286-294 (2003).

Manning, C.D. et al., "Introduction to Information Retrieval", Cambridge University Press, (18 pages) (2008).

Weijer, J. et al., "Coloring Local Feature Extraction" European Conference on Computer Vision, Version 1, pp. 1-14 (2006).

Leonard, A. et al. Lecture Notes in Computer Science, Computer Vision—ECCV 2006, 9th European Conference on Computer Vision, Graz, Austria, Proceedings Part 1, May 7-13, 2006.

Leonard, A. et al. Lecture Notes in Computer Science, Computer Vision—ECCV 2006, 9th European Conference on Computer Vision, Graz, Austria, Proceedings Part II, May 7-13, 2006.

Leonard, A. et al. Lecture Notes in Computer Science, Computer Vision—ECCV 2006, 9th European Conference on Computer Vision, Graz, Austria, Proceedings Part IIII, May 7-13, 2006.

Leonard, A. et al. Lecture Notes in Computer Science, Computer Vision—ECCV 2006, 9th European Conference on Computer Vision, Graz, Austria, Proceedings Part IV, May 7-13, 2006.

International Search Report (PCT/ISA/210) mailed on Dec. 17, 2012, by the Australian Patent Office as the International Searching Authority for International Application No. PCT/AU2012/001277.

Patent Examination Report No. 1 dated Jul. 10, 2014, issued in corresponding Australian Application No. 2012318250.

Patent Examination Report No. 2 dated Jul. 23, 2015, issued in corresponding Australian Application No. 2012318250.

EP Communication issued on Jun. 1, 2015, in corresponding EP Patent Application No. 12842625.1-1954/2769334.

* cited by examiner

IMAGE PROCESSING AND OBJECT CLASSIFICATION

The present invention relates to the field of classification of objects in images or sequences of images. Specifically, the present invention relates to a data structure and scoring method for use in such object classification.

High level autonomous robotic systems require the ability to model and interpret a surrounding environment, an ability provided by a "perception" module. One important feature of the perception module is its ability to classify objects. As an example, a robotic system may be provided with sensors such as a stereo-camera, omni-directional camera and 3D laser. The data gathered from one, some or all of these sensors can then be analysed and used for real time purposes, such as navigation, or for later analysis. One common analysis performed would be object classification in the images and image sequences, for example to aid terrain interpretation in real time or, alternatively, automated labelling of large volume datasets.

For use in robotic systems, it is preferable that the image sequences undergo object classification or feature detection that allows for different objects or features in one image to be compared and matched between images, even if the images capture the object to be matched at, for example, different distances and angles. This means that it is preferable that the object classification, or feature detection, method to be invariant to scale, rotation, occlusion and illumination. In the case where a robotic system moves relative to objects, it becomes possible to use its relative position to those objects to navigate, for example, if objects can be matched from sensor inputs as the same object by the perception module.

In the field of object classification in images, a well known technique known as the "bag of words model" can be used to classify objects in images. The "bag of words model" is traditionally applied to text, the text ranging from sentences to entire documents. The model represents the words in the text in an unordered collection (i.e. disregarding grammar or word order). Once the text is arranged in an unordered collection, the collection can be compared to other similar (unordered) collections of text and then further mathematical tools can be used to infer what the text relates to, or to categorise the text. Such a comparison is used to perform junk e-mail filtering, for example, by comparing every e-mail as a "bag of words" to a sample spam "bag of words" word set using some form of statistical model.

The "bag of words model" technique, when applied to classification of objects in images, involves representing image content as a "bag of visual words". The image in which objects are to be classified can be treated as a document and image content, or "features", extracted from the image are considered as the words, which are then termed "visual words" or "codewords". The "bag of visual words model" technique is sometimes referred to as the "bag of features model".

To represent an image as a document however, mechanisms must be used to generate the "visual words" from the image. Initially, regions containing information in an image, known as keypoints, are detected in the image using one of a variety of keypoint detection methods. These keypoints are described and formulated into vectors, known as descriptor vectors, which are clustered into visual words that represent common local patterns. The visual words are typically represented using vectors termed appearance descriptors. Some commonly used appearance descriptors are the Scale Invariant Feature Transform (SIFT) and Speeded-Up Robust Features (SURF) as these provide some or all of the characteristics mentioned earlier of being invariant to scale, rotation, occlusion and illumination. These appearance descriptors are numerical vectors that represent the visual words.

The visual words are used to form a visual vocabulary or "codebook", in essence a dictionary of the features represented by the appearance descriptors, or visual words, found in the image or images.

Codebook generation, i.e. generating the dictionary of the visual words, is commonly achieved by grouping the appearance descriptors into a pre-specified number of clusters. There are two ways to generate a codebook: supervised and unsupervised. In both methods of generation, the feature descriptors, i.e. visual words, are classified into several classes. Supervised codebook generation involves only clustering together feature descriptors, i.e. visual words, in the same class while unsupervised codebook generation clusters together feature descriptors, i.e. visual words, of any class and classifies the clusters based on the dominant class. Typically, supervised codebook generation provides a higher degree of classification accuracy, precision and recall when compared to unsupervised codebook generation.

Vocabulary trees can be built from a codebook generated for a training data set to facilitate a more rapid classification of keypoints in images through use of the vocabulary tree when performing object recognition for future images or image sequences.

Vocabulary trees are data structures that allow the efficient association of feature descriptors from a real dataset to visual words generated from a training dataset. As features are propagated down the vocabulary tree, the focus area of the search is reduced, meaning that the number of computations required is significantly reduced (compared to a nearest neighbour approach which requires calculation of distances between one feature and all visual words in the codebook). For a vocabulary tree developed using a supervised codebook, the discriminative nature of the vocabulary words can be assessed as non-discriminative words will be grouped together in the final layer of the tree as they are close together in feature space.

For example, in the paper "*Scalable recognition with a vocabulary tree*", by Nister, D. and Stewenius, H. (2006), published in "Computer Vision and Pattern Recognition", the authors disclose a method of generating a vocabulary tree that uses a simple method for object retrieval using the "bag of visual words" technique rather than a more complicated probabilistic method. In this simple method, image recognition is performed by first developing the vocabulary tree in a hierarchical k-means clustering approach. The training feature descriptors are clustered using the k-means clustering algorithm and each feature is associated to one cluster centre. The features inside each cluster are then clustered again in a recursive manner, repeatedly splitting each cell into k cells. The tree grows to a number of levels L. Recognition is performed by propagating the descriptors down the tree and comparing to each cluster centre at each level. A scoring technique is used to determine the relevance of a database image to the test image and this is done through the use of inverted files. These store the IDs of images where a node in the tree occurred as well as how many times the word occurred in the image. As a result of this, query vectors and database vectors can be developed based on the feature paths of all descriptors within an image. Comparing the normalised vectors means the relevance between a test image and a database image can be determined.

Conventionally generated vocabulary trees, when created using a codebook that has been generated in a supervised manner, tend not to be as beneficial as theoretically possible. A reason for this is that, after the first layer of the vocabulary tree is developed, the remaining layers tend to offer little or no discrimination between object classes (i.e. they tend to be uniform in nature).

According to a first aspect of the present invention, there is provided a method for classifying objects from one or more images comprising the steps of: generating a trained classification process; and using the trained classification process to classify objects in said one or more images; wherein generating the trained classification process comprises the steps of: extracting features from one or more training images and clustering said features into one or more groups of features termed visual words; storing data for each of said visual words, including colour and texture information, as descriptor vectors; and generating a vocabulary tree to store clusters of visual words with common characteristics; and wherein using the trained classification process to classify objects in said one or more images comprises the steps of: extracting features from said one or more images and clustering said features into groups of features termed visual words; searching the vocabulary tree to determine the closest matching clusters of visual words; and classifying objects based on the closest matching clusters of visual words in the vocabulary tree.

The present invention is now described in more detail, with reference to exemplary embodiments and the accompanying drawings using like reference numerals, in which.

Figure 1:
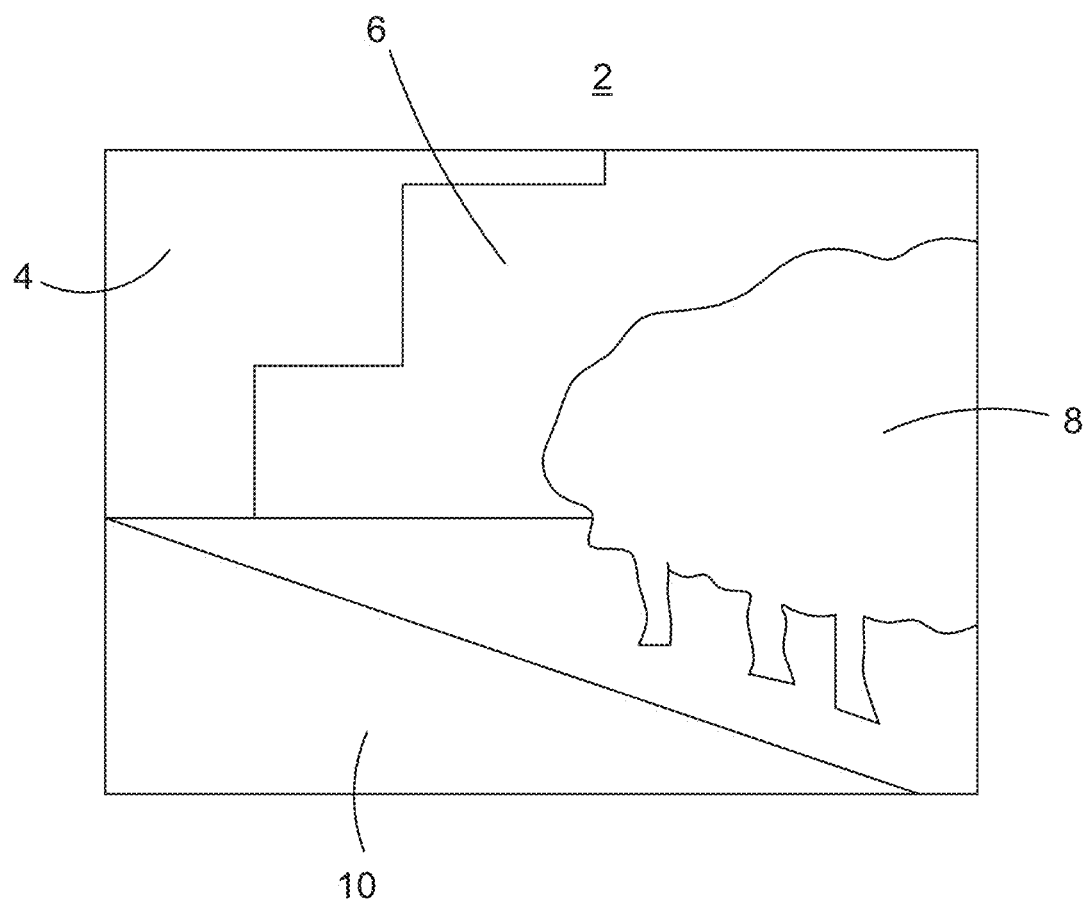
FIG. 1 is a schematic illustration (not to scale) of an example image that is useful in the understanding of an embodiment of an image-based object classification process.

Referring to FIG. 1, the example image 2 is a schematic illustration (not to scale) of a photograph that would be used in an embodiment of a vocabulary tree generation process according to the present invention. In this example, the image 2 is a colour photograph of an urban scene captured with a conventional visible light camera. The image 2 comprises the following objects: sky 4, a building 6, a tree 8, a road 10.

Images of the type shown in FIG. 1 are used to train an object classification process, through the use of a known training data set of images with known contents. Once the object classification process is "trained" using this known training data set, objects in images of the type shown in FIG. 1 are classified by the trained object classification process.

It should be noted that the image 2 has been deliberately over-simplified in order to illustrate the process of training a classification process and then the use of a "trained" classification process.

As the vocabulary tree is built in a supervised manner, a training process is needed. Building the vocabulary tree requires a labelled dataset, i.e. a batch of images that have features pre-labelled, in order that the codebook can be developed in a supervised manner. It is developed by using k-means clustering for each subject class and developing the centres which represent each class.

Apparatus, for performing the method steps to be described later below, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

Figure 2:
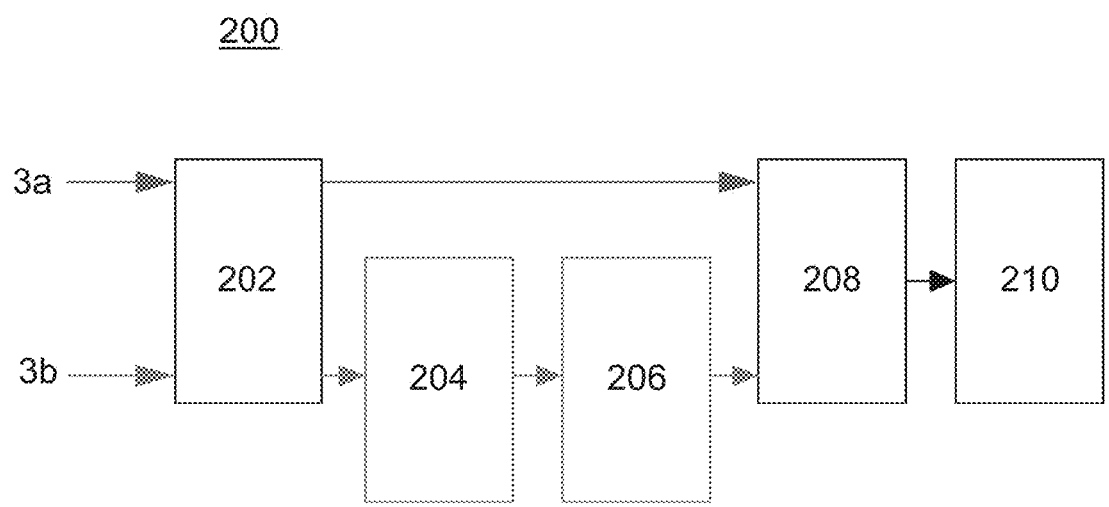
FIG. 2 is a simplified overview of part of a training process and object classification process.

FIG. 2 is a flowchart showing an overview of the steps performed in an object classification process 200 that incorporates the present invention, both when training images and classifying images.

To train the classification process 200, a batch of pre-labelled test images 3b is subjected to the training stream of the classification process: first each image 3b undergoes the feature extraction/description step 202; then the extracted features undergo clustering in step 204, followed by the generating visual words from the clusters in step 206; the visual words are used to generate a vocabulary tree in step 208; and the classification of objects occurs, using the generated vocabulary tree, in step 210.

In step 202, keypoints in the images 3b are described by feature descriptors and are associated with an object class based on the annotation of the image 3b. This builds up a large dataset of features from different object classes.

Figure 8:
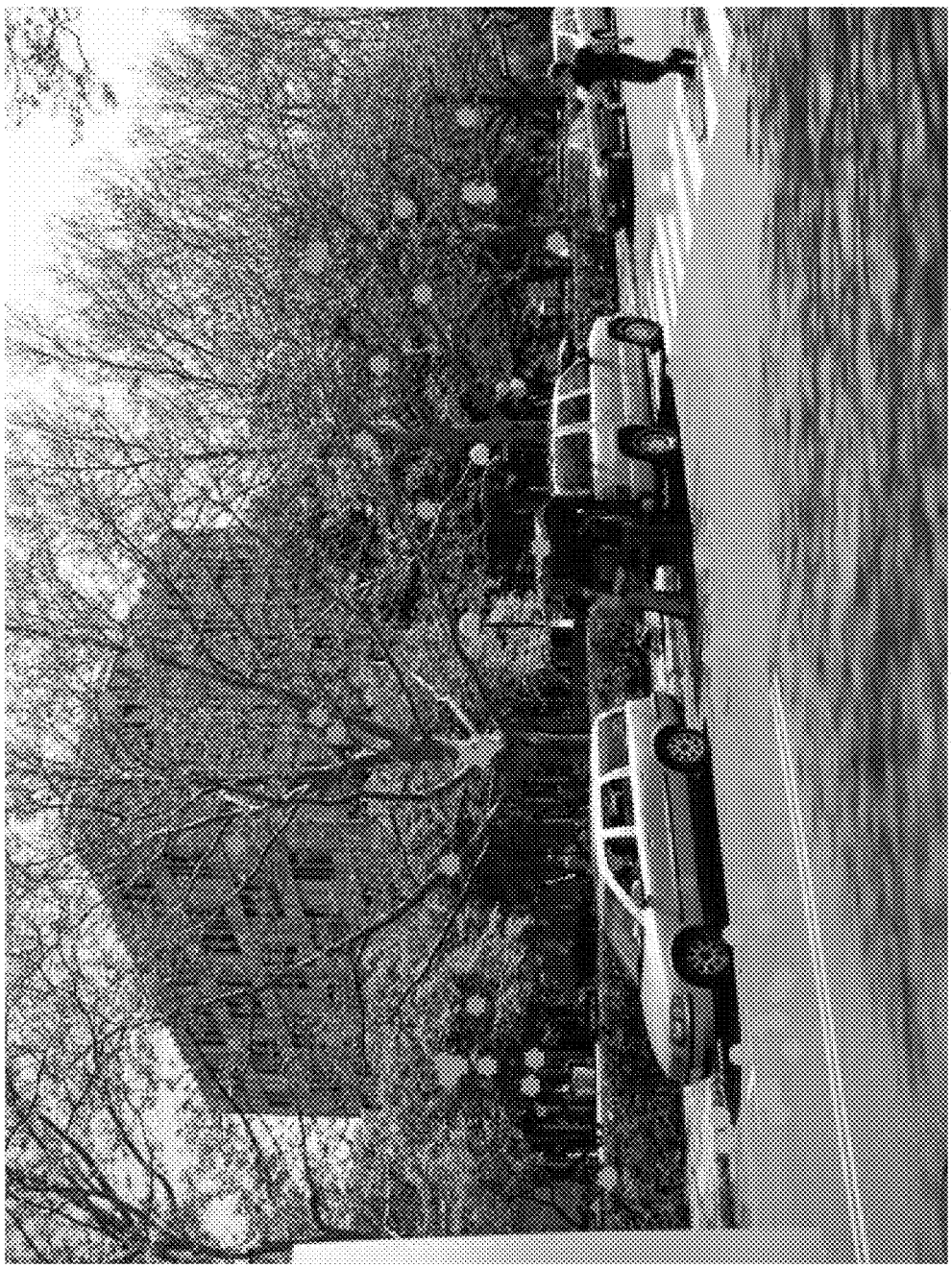
FIG. 8 is a sample image with keypoints extracted and highlighted.

Step 204 takes the feature descriptors associated with each class and clusters each class individually into a specified number of visual words. These visual words can be developed using such techniques as k-means clustering. Process 208 takes the visual words and develops a vocabulary tree starting at the bottom layer and then building common nodes between the bottom layers until nodes reach the top layer with several layers in between. Groups of visual words that are close together in feature space, as seen in FIG. 8, are grouped together using a clustering algorithm to develop nodes in a higher layer of the vocabulary tree. This process is performed a number of times depending on the depth factor, indicated by the user.

To classify images once process 200 is trained, images 3a are fed into the process 200 and the image 3a undergoes the feature extraction/description step 202; this is followed by the use of the vocabulary tree to shortcut clustering and generating visual words for the extracted and described features in step 208. In FIG. 8, a sample image is marked with dots indicated features detected in an example of the process 202.

Figure 5:
FIG. 5 is a sample image divided up into shaded regions representing detected objects by a classification method of the present invention.

Then the classification of objects in image 3a occurs in step 210. This ultimately ends with data allowing an image to be marked up as per the example in FIG. 5, where objects are indicated on the sample image.

Figure 7:
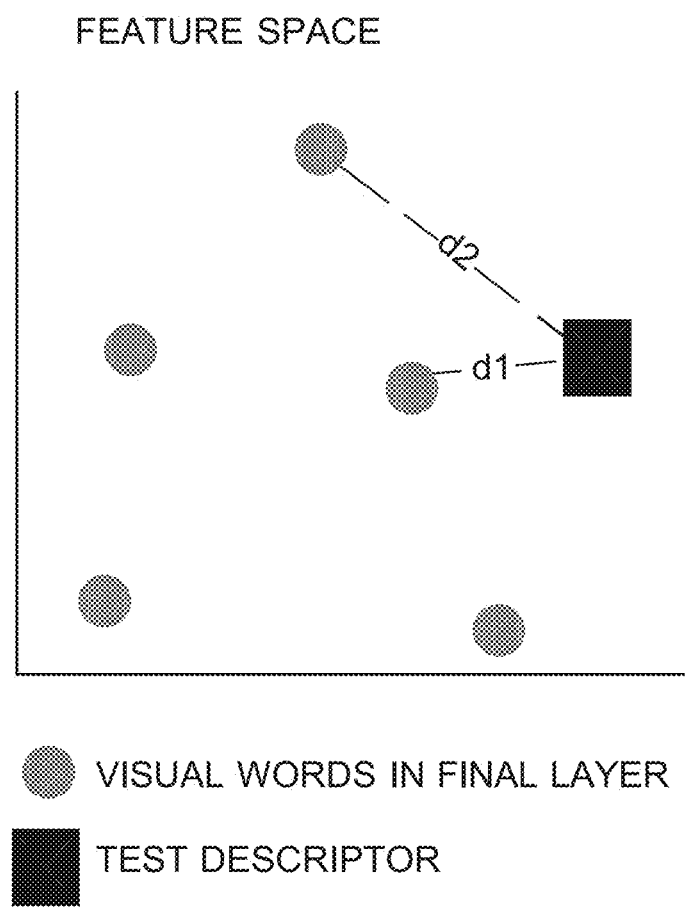
FIG. 7 is a representation of proximity in feature space used for determining how "close" visual words are to a test descriptor in a final layer of a vocabulary tree.

When classifying images, features extracted from each image in process 202 are propagated through the vocabulary tree in step 208 with the path of propagation being based on a nearest neighbour approach. Once the features are propagated through the vocabulary tree, the distances between the feature descriptor and the visual words are calculated as in FIG. 7. FIG. 7 shows several visual words in the final layer of the vocabulary tree compared to a test descriptor, all in feature space, and the distances $d_1$ and $d_2$ in feature space between two such visual words in the final layer of the vocabulary tree.

A scoring mechanism is used to calculate a locality based score, and a visual word based score is calculated assessing the discriminative nature of the word. A threshold is used to determine whether a feature is associated with the closest visual word class in step 210, or left labelled as unknown.

Figure 3:
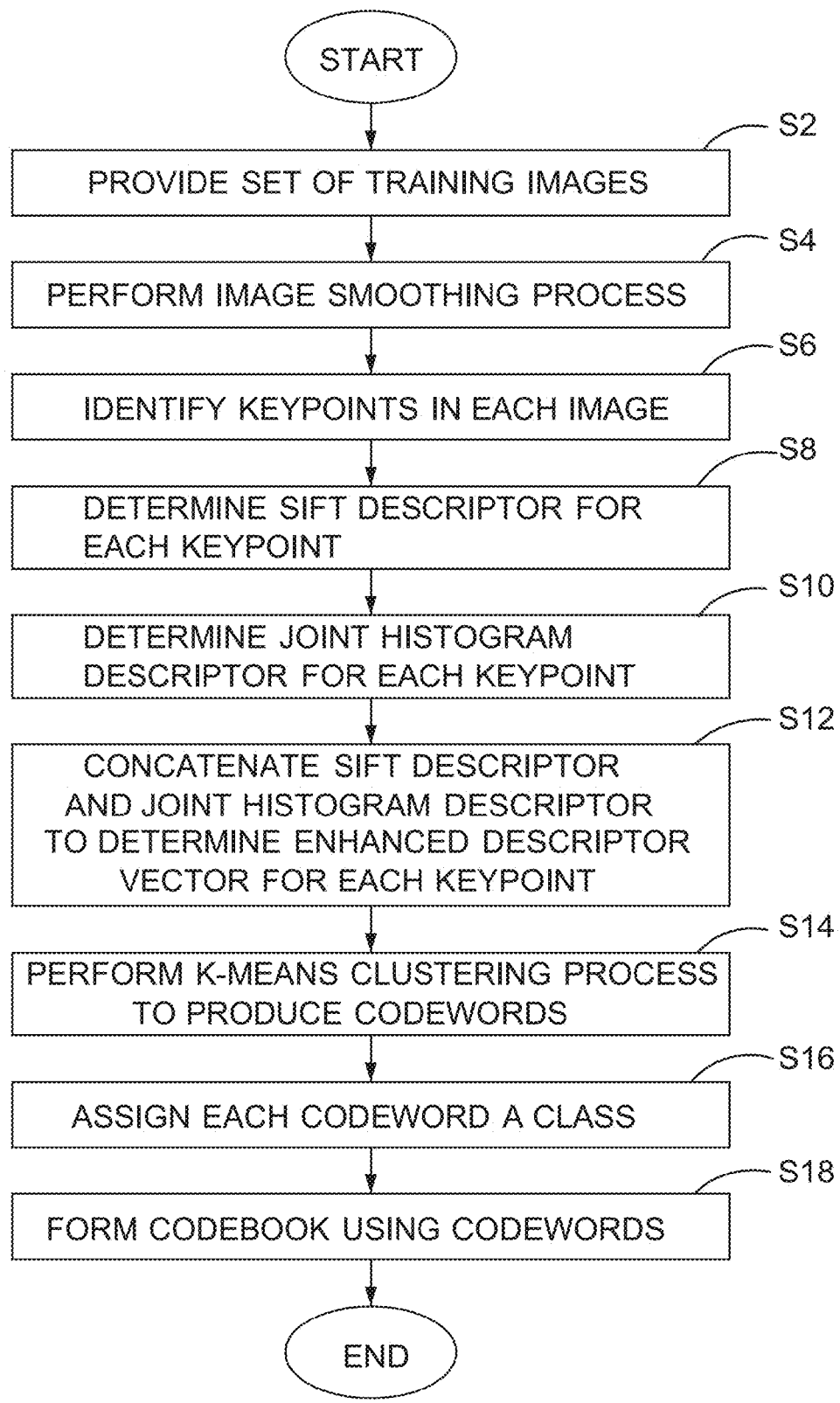
FIG. 3 is a process flowchart showing certain steps of a training process for the object classification process.

FIG. 3 is a process flowchart showing certain steps of an example training process for the object classification process.

At step s2, a set of training images 3b is provided.

In this example, the set of training images comprises images of the type shown in FIG. 1, i.e. comprising one or more of the same type of objects contained in image 2 (for instance sky 4, a building 6, a tree 8, a road 10).

In this example, a set of training images that comprises 75 different images is used. However, in other examples, the set of training images comprises a different number of images, some of which may be identical or substantially identical.

At step s4, an image smoothing process is performed on each of the images in the set of training images.

In this example, the image smoothing process is a conventional process. Image smoothing is performed by running a Gaussian filter over the images, together with histogram equalisation. The application of this filter "smoothes" the image by blurring the image, allowing the image noise to be reduced and also reducing the sensitivity of the feature extraction process.

At step s6, a feature extraction process is performed on each of the images in the set of training images.

The feature extraction process extracts points corresponding to "interesting" features in an image, where "interesting" is usually defined based on specific metrics such as change in gradients in different directions, or stability of areas at different scales, and these points are termed "keypoints".

In this example, the keypoints are selected/extracted on a dense regular grid using the Pyramid Histogram of Words (PHOW) algorithm, although any other keypoint detection method can be used, for instance a SIFT detector or Harris corners.

Further information on the PHOW algorithm, which is an implementation of a dense-SIFT algorithm, can be found in "*Vlfeat—an open and portable library of computer vision algorithms*", Andrea Vedaldi and Brian Fulkerson, which is incorporated herein by reference.

Also, further information on using a regular dense grid with SIFT can be found in "*Scene classification using a hybrid generative/discriminative approach*", Anna Bosch, Andrew Zisserman, and Xavier Munoz, IEEE Transactions on Pattern Analysis and Machine Intelligence, 2008, which is incorporated herein by reference.

A regular dense grid is made up of points in the image extracted at positions such that the distance between any point and each of that point's neighbours is the same. At these points, the image can be scaled and an orientation of a descriptor defined such that a SIFT descriptor can be extracted.

In other examples, one or more other processes are used to detect/extract keypoints instead of or in addition to the PHOW algorithm. For example, in other examples a Difference of Gaussians (DoG) keypoint extractor is used, such as that described in "*Distinctive image features from scale-invariant keypoints*", Lowe, D. G. (2004) in the International Journal of Computer Vision, which is incorporated herein by reference. The DoG keypoint extractor highlights scale and rotationally invariant points.

The preferred method of selecting/extracting keypoints is using a Difference of Guassian and/or Lowe's SIFT descriptor.

At step s8, for each of the images in the set of training images, a SIFT descriptor vector is determined for each of the keypoints extracted from that image.

In this example, the SIFT descriptor vector is determined using conventional methods.

Further information on the determination on SIFT descriptor vectors can be found in "*Distinctive image features from scale-invariant keypoints*", David G. Lowe, International Journal of Computer Vision, 2004, which is incorporated herein by reference.

At step s10, for each of the images in the set of training images, a "Joint Histogram" descriptor vector is determined for each of the keypoints extracted from that image.

A Joint Histogram is a keypoint descriptor that combines information about an object's colour with other information, such as texture or edge density. A Joint Histogram originates from a colour histogram and the additional information extends the dimensionality of the descriptor.

Further information relating to joint histograms can be found in "*Comparing images using joint histograms*", Greg Pass and Ramin Zabih, Multimedia Systems, page 234, 1999, which is incorporated herein by reference. The paper describes the formation of the joint histogram as an image descriptor by developing colour and other information for each pixel. This can include texture, edge density, etc. Each pixel is therefore represented by an "n-tuple", where n represents the number of dimensions of the measured information. These "tuples" represent a bin in the n-dimensional histogram, so a joint histogram is developed for an image by analysing the "tuples" for each pixel and incrementing the respective bin in the histogram.

In this embodiment, a Joint Histogram descriptor for a key point is determined using a modified version of the Joint Histogram proposed by Pass and Zabih. In this embodiment, instead of calculating a global descriptor for the full image, a local feature descriptor on an image patch around the keypoint is computed.

Specifically, the determination of a Joint Histogram descriptor comprises converting the image from being in the Red-Green-Blue (RGB) colour space to being in the Hue, Saturation, Value (HSV) colour space. HSV colour space is used as it offers a large amount of information about an image which is not available in the RGB colour space. Saturation and Value allow analysis of the levels of white, grey and black in the pixel set, while the hue channel allows the colour to be represented by a single number instead of three numbers. Hue and Intensity readings are then extracted from the image.

In this embodiment, values for two parameters (which influence the Joint Histogram's performance and dimensions) are then defined. These parameters are:

Window Size, W (the local region centred around the keypoint for is which colour information will be described). In this embodiment, the window size is 18×18 pixels; and Resolution, R (a discretisation factor for a Joint Histogram matrix). In this embodiment, the resolution is R=6.

Texture analysis is then performed on the image using the extracted intensity readings. This texture analysis comprises counting the number of neighbouring pixels whose intensities differ by more than a certain fixed intensity value.

After normalisation, all the hue values in the image patch lie in the interval [0, $n_{hue}$], where $n_{hue}$ is a positive constant that represents the maximum value on the scale of hue. Similarly, all texture values in the image patch lie in the interval [0, $n_{texture}$], with $n_{texture}$ being the maximum value on the scale of texture. The hue scale and the texture scale for the image are discretised into an R×R two-dimensional matrix (the Joint Histogram matrix), whose elements are initially set to zero.

In this embodiment, a keypoint in the image is then analysed to determine the hue value h and the texture value t for that keypoint. The value of the $$\left(\text{round}\left(\frac{h \cdot R}{n_{hue}}\right), \text{round}\left(\frac{t \cdot R}{n_{texture}}\right)\right)$$

element in the Joint Histogram matrix is then incremented. Here, the term round(X) denotes the integer that lies closest to X in absolute distance.

This process of analysing a keypoint and incrementing the matrix element associated with the Hue and Texture values of that keypoint is iterated until all keypoints have been processed.

In other embodiments, further information is represented in the Joint Histogram descriptor. Indeed, greater accuracy tends to be achievable by including more information with the Joint Histogram descriptor, e.g. using a three or four-dimensional histogram (with a corresponding increase in computational power needed) that includes colour, texture and edge or gradient density. Also, improved results tend to be achievable by using entries larger than a given threshold to reduce noise.

In this example, using the 6×6, i.e. R×R Joint Histogram matrix, a Joint Histogram descriptor vector is formed. In this example, the Joint Histogram descriptor vector has 36 elements.

Figure 6:
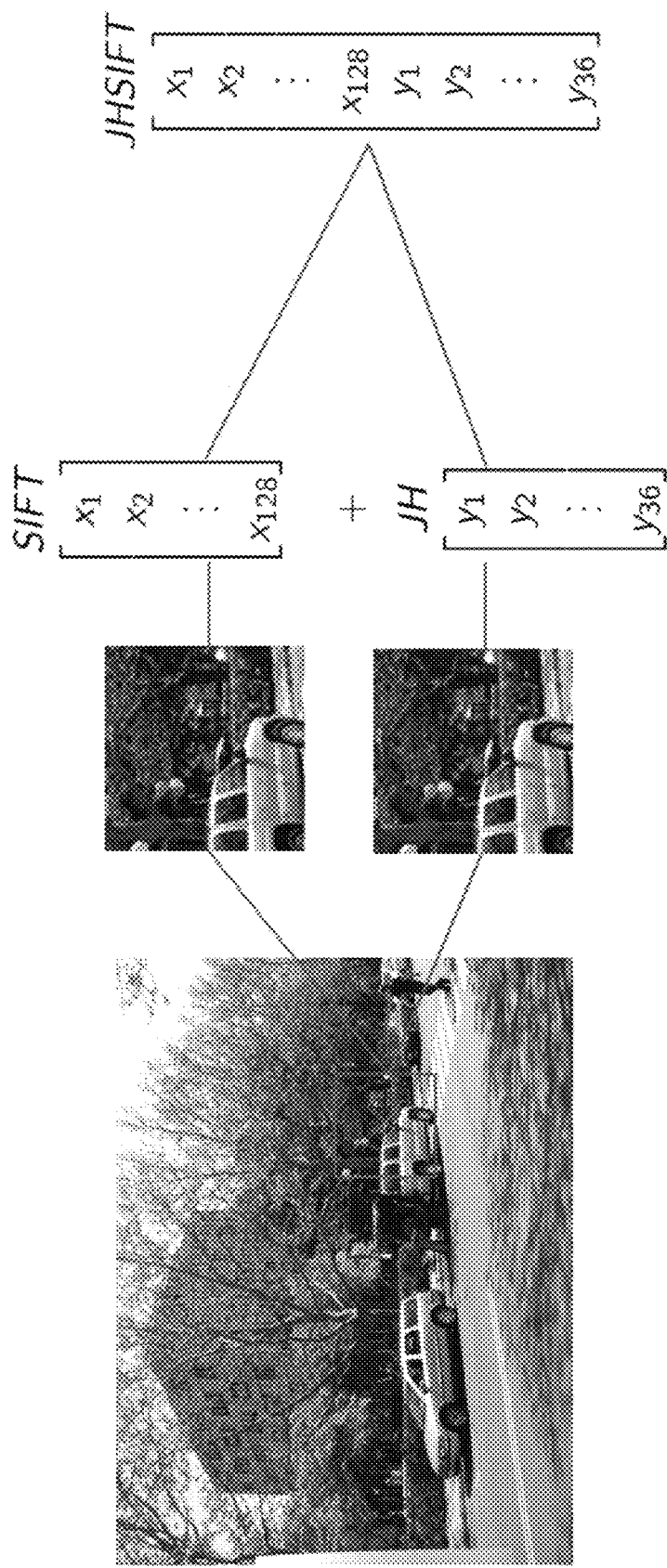
FIG. 6 is an example image with a highlighted area within the image and a SIFT and JH descriptor being formed for that highlighted area and combined into a JHSIFT descriptor.

At step s12, for each keypoint in each image, the SIFT descriptor vector and the Joint Histogram descriptor vector for that keypoint are concatenated. A vector resulting from the concatenation of a SIFT descriptor vector and a Joint Histogram descriptor vector is hereinafter referred to as an "enhanced descriptor vector". An example of this is illustrated in FIG. 6.

Thus, in this example, for each keypoint, a 164-dimensional descriptor vector (i.e. a concatenation of a 128-dimensional vector and a 36-dimensional vector) is generated.

Such an enhanced descriptor vector is a feature descriptor that advantageously tends to provide invariance to scale, rotation, and occlusion, while also containing information describing the colour of a local region.

At step s14, a process of vector quantisation is performed on each of the enhanced descriptor vectors generated at step s12 above.

In this embodiment, the vector quantisation process groups the enhanced descriptor vectors into a number of clusters, each cluster represented by a so-called 'codeword'. In this example, a codeword is representative of one or more similar enhanced descriptor vectors.

In this embodiment, converting the enhanced descriptor vector into a set of codewords is carried out by applying a conventional process. In particular, a K-means clustering process is performed over all the enhanced descriptor vectors. Codewords are then defined as the centres of the learned clusters. Thus, each enhanced descriptor vector of an image is mapped to a certain codeword through the clustering process.

Further information relating to the K-means algorithm can be found in "*Chapter 20. An Example Inference Task: Clustering*", MacKay, David (2003), is Information Theory, Inference and Learning Algorithms, Cambridge University Press, pp. 284-292, which is incorporated herein by reference.

At step s16, each codeword is assigned a class (i.e. sky, tree, building, road) based on its constituent enhanced descriptor vectors.

At step s18, a so called "codebook" is generated. In this embodiment, the codebook is the set of all the codewords generated by processing all of the images in the set of training images.

Thus, a training process for the object classification process is provided. This training process generates a codebook of codewords that can be used to classify objects/features in test images.

In this example, the codebook has been learnt in a "supervised" manner. In particular, the codebook is generated by clustering the descriptors independently for each known class. This provides a set of clusters with a class assigned, which is to be matched with the test image descriptors.

However, in other embodiments, the codebook may be learnt in a different type of supervised manner. Also, in other embodiments the codebook may be learnt in an "unsupervised" manner and a model may be considered. For example, in other embodiments, first the codebook is generated using all the descriptors extracted from the training set, and then a model that considers some characteristic in the data is learnt. Examples of the types of models that may be learnt following codebook generation are the Probabilistic Latent Semantic Analysis (pLSA) model, and the Latent Dirichlet Allocation (LDA) model. There is no real dependence on the fact that the classes of the object are already known.

What will now be described is an embodiment of a method of generating a vocabulary tree. This vocabulary tree advantageously tends to provide rapid classification of keypoints in test images and image sequences.

Information which is useful for understanding the below description of the embodiment of a method of generating a vocabulary tree is provided in "*Scalable recognition with a vocabulary tree*", Nister, D. and Stewenius, H. (2006), Computer Vision and Pattern Recognition, which is incorporated herein by reference.

Figure 4:
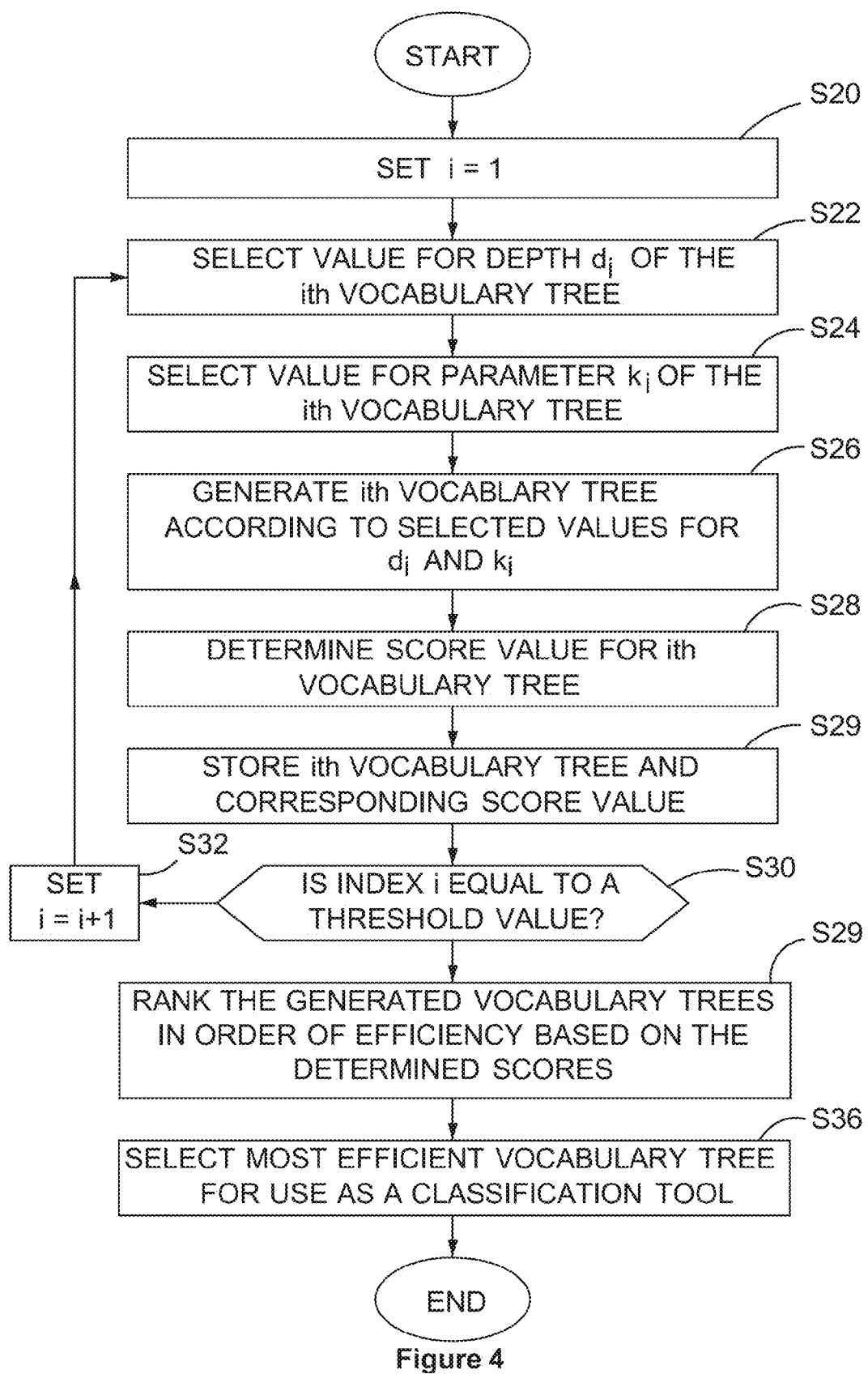
FIG. 4 is a process flowchart showing certain steps of a method of generating a vocabulary tree for use in a classification process.

FIG. 4 is a process flowchart showing certain steps of a method of generating a vocabulary tree for use in a classification process.

At step s20, an index i is set to be equal to one (i.e. i=1).

Steps s22 to s26 describe the construction of an ith vocabulary tree.

At step s22, a value for a "depth" of a vocabulary tree is selected. This value of the depth of the ith vocabulary tree is hereinafter denoted by d. The depth of a vocabulary tree is the number of layers in the vocabulary tree, excluding the root node of the vocabulary tree. Depth can be chosen manually.

At step s24, a value for a number of nodes in each of the layers that contain multiple nodes of the ith vocabulary tree is specified. This value number of nodes in each layer of the ith vocabulary tree is hereinafter denoted by $k_i$.

At step s26, the codewords (that are generated using the training process that is described above with reference to FIG. 2) are repeatedly clustered to produce the ith vocabulary tree that has a depth equal to $d_i$ (specified at step s22) and a number of nodes in each of the layers that contain multiple nodes equal to $k_i$ (specified at step s24). In this embodiment, the ith vocabulary tree is generated using a process of hierarchical agglomerative clustering. Hierarchical agglomerative clustering is a known data structure. In general, hierarchical clustering algorithms are either top-down or bottom-up. Bottom-up algorithms successively agglomerate pairs of clusters until all clusters have been merged into a single one that contains all documents. Bottom-up hierarchical clustering is therefore called hierarchical agglomerative clustering. This approach utilises a bottom-up approach with successive merging of visual-words as the tree is being built.

Hierarchical agglomerative clustering depends on the application as to how the tree is built. Once can refer to Christopher D. Manning, Prabhakar Raghavan and Hinrich Schütze, Introduction to Information Retrieval, Cambridge University Press. 2008. Chapter 17 Hierarchical Clustering for further details.

To produce the vocabulary tree, we first use k-means clustering on the extracted descriptors from the training dataset to form a supervised codebook. The tree is developed for a specified number of layers (depth), with k being a parameter that determines the breadth of a particular layer. For the tree used in this work, the number of nodes in the layer i is equal to k^i, where the root node has i=1. To compute the nodes for each layer, the number of nodes is first computed using the above process, and this is used in the k-means clustering algorithm to group similar nodes together.

FIGS. 9A to 9D are schematic illustrations showing stages in the development of an example of a vocabulary tree 20.

Figure 9A:
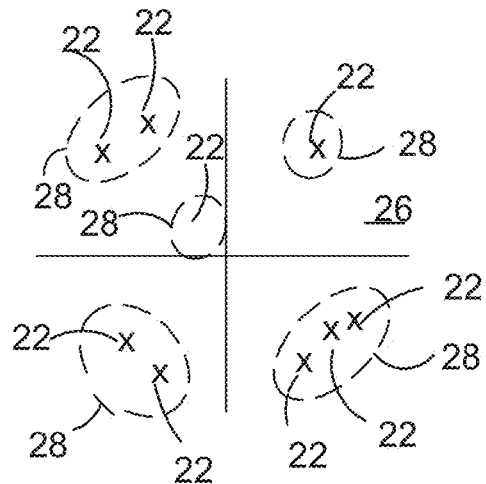
FIG. 9A is a schematic illustration showing positions of nine visual codewords of an example vocabulary tree in the feature space of the codewords.
Figure 9B:
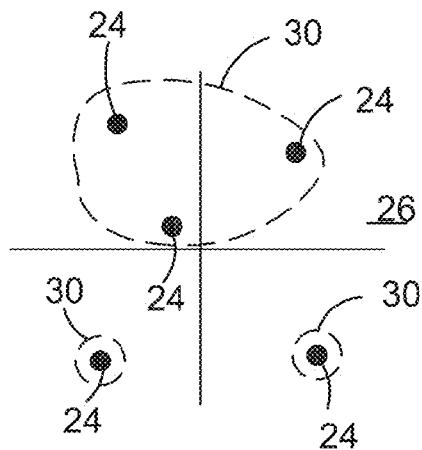
FIG. 9B is a schematic illustration showing positions of nodes of the example vocabulary tree in the feature space of the codewords.
Figure 9C:
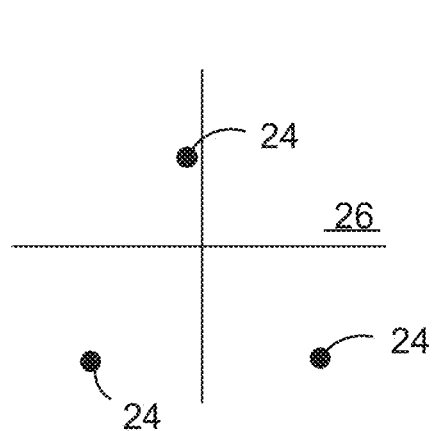
FIG. 9C is a schematic illustration showing positions of nodes of the first layer of the example vocabulary tree in the feature space of the codewords.
Figure 9D:
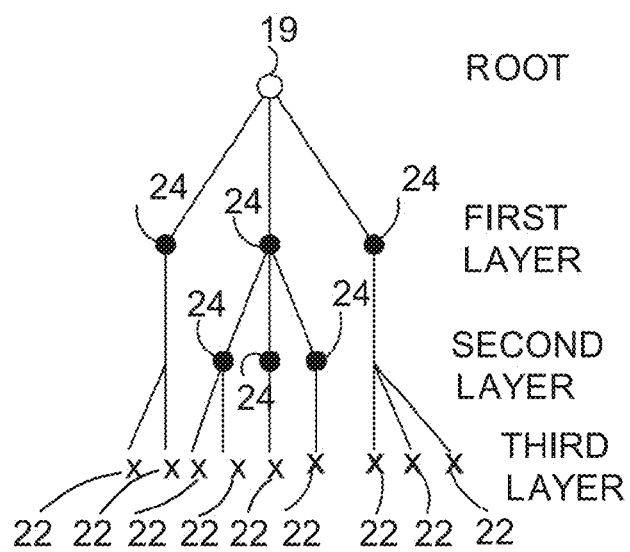
FIG. 9D is a schematic illustration of the example vocabulary tree.

The vocabulary tree 20 is shown in FIG. 9D.

The visual codewords of the vocabulary tree are indicated in FIGS. 9A-9D by the reference numeral 22. The nodes of the vocabulary tree are indicated in FIGS. 9A-9D by the reference numeral 24.

In this example, the vocabulary tree 20 is constructed using the above described hierarchical agglomerative clustering process from nine visual codewords 22.

In this example, the vocabulary tree 20 is constructed such that it has a depth of three layers (i.e. $d_i$=3). Also, the vocabulary tree 20 is constructed such that the number of nodes 24 in each of the layers that contain multiple nodes 24 is equal to three (i.e. $k_i$=3).

In this example, the vocabulary tree 20 comprises a root node 19 and three layers. The first layer of the vocabulary tree 20 stems from the root node 19 and comprises three nodes 24. The second layer of the vocabulary tree 20 stems one of the nodes 24 in the first layer and comprises three nodes 24. The third layer of the vocabulary tree 20 comprises the nine visual codewords 22, which each branch from one of the nodes in the vocabulary tree 20.

FIG. 9A is a schematic illustration showing positions of the nine visual codewords 22 in the feature space 26 of the codewords 22.

In this example, the nine codewords 22 form the final (i.e. third layer) of the vocabulary tree 20.

In FIG. 9A, dotted lines and the reference numeral 28 indicate clusters of visual codewords 22. The visual codewords 22 in each of the codeword clusters 28 are deemed to be sufficiently close together in the feature space 26 so as to be described by a common node 24 (i.e. visual word) of the vocabulary tree 20. Sufficiently close means that the nodes are in the vicinity of each other, such that they are merged to a single node by the application of the k-means clustering algorithm.

In this example, the codeword clusters 28 are used to form the nodes 24 of the vocabulary tree 20 in the first and second layers of the vocabulary tree 20.

FIG. 9B is a schematic illustration showing positions of nodes 24 of the vocabulary tree 20 in the feature space 26 of the codewords 22.

In this example, each of the nodes 24 is positioned at the "centre of mass" of a respective codeword cluster 28.

In FIG. 9B, dotted lines and the reference numeral 30 indicate clusters of nodes 24. The nodes 24 in each of the node clusters 30 are deemed to be sufficiently close together in the feature space 26 so as to be described by a common node 24 of the vocabulary tree 20. In this example, the node clusters 30 are used to form the nodes 24 of the vocabulary tree 20 in the first layer of the vocabulary tree 20.

FIG. 9C is a schematic illustration showing positions of nodes 24 of the first layer of the vocabulary tree 20 in the feature space 26 of the codewords 22.

In this example, each of the nodes 24 is positioned at the "centre of mass" of a respective node cluster 30.

FIG. 9D is a schematic illustration of the example of the vocabulary tree 20.

The third layer of the vocabulary tree 20, which comprises the nine codewords 22, is shown in FIG. 9A.

The second layer of the vocabulary tree 20, which comprises three nodes 24 that belong to a common node cluster 30, is shown in FIG. 9B.

FIG. 9B also shows two node clusters 30 that each contains a single node. These are used to form nodes 24 in the first layer of the vocabulary tree 20.

The third layer of the vocabulary tree 20, which comprises three nodes 24 that is each positioned at the centre of mass of a respective node cluster 30, is shown in to FIG. 9C.

At step s28, a score value for the ith vocabulary tree is determined.

In this embodiment, the score value for the ith vocabulary tree is a value that is indicative of how well the ith vocabulary tree is able to associate identical descriptors together.

In this embodiment, the score value for the ith vocabulary tree is determined by using the ith vocabulary tree to classify each of the codewords in the visual codebook (from which the ith vocabulary tree was generated at step s26). The score value is indicative of how well the ith vocabulary tree classifies each of the codewords as itself.

In other words, the structure of the ith vocabulary tree is evaluated by passing each of visual codewords through the ith vocabulary tree and assessing how well those codewords are classified.

In this embodiment, the ith vocabulary tree is used to classify a visual codeword in a conventional way. Firstly, a codeword to be classified is classified as one of the nodes that stems from the root node of the ith vocabulary tree. In this embodiment, this is done using a conventional "nearest neighbour" process and weighted distance function (such as that described in "*Distinctive image features from scale-invariant keypoints*", Lowe, D. G. (2004), International Journal of Computer Vision, which is incorporated herein by reference). The codeword to be classified is then classified as one of the nodes that stems from the node it has just been classified as (again using a conventional "nearest neighbour" process and weighted distance function). This process of classifying the codeword to be classified as one of the nodes that stems from the node it has just been classified as is repeated until the codeword to be classified is classified as one of the code words in the final layer of the ith vocabulary tree.

In this embodiment, the score for the ith vocabulary tree is determined using the following equation:

$$score_i = 0.6(100 - c_i) + 0.3\mu_i + 0.1\sigma_i$$

where: $c_i$ is the percentage of codewords from the codebook that the ith vocabulary tree classifies correctly;

$\mu_i$ is the mean number of classification decisions made (i.e. the mean number of times the "nearest neighbour" process is performed) during the process of using the ith vocabulary tree to classifying a codeword from the codebook. In other words, $\mu_i$ is the total number of classification decisions made to classify all of the codewords in the codebook, divided by the number of codewords in the codebook; and $\sigma_i$ is the standard deviation of the number of classification decisions made (i.e. the standard deviation of the number of times the "nearest neighbour" process is performed) during the process of using the ith vocabulary tree to classifying a codeword from the codebook. A high $\sigma_i$ tends to indicate that an uneven distribution of leaves (codewords) exists in the final layer of the ith vocabulary tree.

At step s29, the ith vocabulary tree along with the corresponding score value, $score_i$, are stored.

At step s30, it is determined whether or not the index i is equal to a predetermined threshold value.

In this embodiment, the predetermined threshold value is equal to thirty.

If at step s30, it is determined that the index i is not equal to the predetermined threshold value, the method proceeds to step s32.

However, if at step s30, it is determined that the index i is equal to the predetermined threshold value, the method proceeds to step s34.

At step s32, the index i is increased by one (i.e. i=i+1).

After step s32, the method proceeds back to step s22. In this way, the method iteratively generates vocabulary trees and corresponding scores for those vocabulary trees.

In this embodiment, the values for $d_i$ and $k_i$ selected at steps s22 and s24 respectively, are selected so that no vocabulary tree generated during the process of FIG. 4 has the same values for both $d_i$ and $k_i$ as a different vocabulary tree (i.e. a vocabulary tree generated in a previous iteration of steps s22 to s30) generated during the process of FIG. 4.

In this embodiment, in each iteration of the steps s22 to s30, the value for the depth $d_i$ of the ith vocabulary tree is either 1, 2, 3, 4, or 5. Also, in this embodiment in each iteration of the steps s22 to s30, the value for the $k_i$ of the ith vocabulary tree is either 1, 2, 3, 4, 5, or 6.

At step s34, the vocabulary trees (of which, in this embodiment there are thirty) are ranked in order of decreasing score value. In this embodiment, the score value of a vocabulary tree is indicative of that vocabulary tree's classification efficiency.

At step s36, the most efficient vocabulary tree (i.e. the vocabulary tree corresponding to the highest score value) is selected for use in a classification process.

Thus, a method of generating a vocabulary tree for use in a classification process is provided.

In this embodiment, this generated vocabulary tree is used to classify test descriptors of images in a conventional way.

An advantage provided by the above described method of generating a vocabulary tree for use in a classification process is that a vocabulary tree which tends to associate a test visual-word to itself with a relatively high degree of accuracy is produced. Furthermore, the generated vocabulary tree tends to do this using a relatively low number of computations.

A further advantage provided by the above described method of generating a vocabulary tree for use in a classification process is that a problem of the clustering of visual words at higher layers of the tree resulting in an incorrect grouping of similar visual-words is alleviated.

A further advantage is that rapid classification of image sequences tends to be facilitated. This is particularly useful for real-time applications such as obstacle avoidance and terrain evaluation. This advantage tends to be provided by the relatively small number of computations performed during classification.

In other words, the above described vocabulary tree advantageously facilitates the rapid classification of keypoints in images and image sequences. The above described vocabulary tree data structure and scoring system can advantageously be utilised with a supervised object classification system.

Supervised codebook generation tends to provide a relatively higher degree of classification accuracy, precision and recall when compared to unsupervised codebook generation. This tends to mean that conventional methodologies of generating a vocabulary tree, such as that described in "*Scalable recognition with a vocabulary tree*", Nister, D. and Stewenius, H. (2006) Computer Vision and Pattern Recognition, are unsuitable. Typically, conventional methods of generating a vocabulary tree use a top-down approach wherein data is repeatedly clustered at each level of the tree. Applying such a process to a codebook generated by a supervised process would tend to provide that, once the first layer of the vocabulary tree has been formed, the remaining layers of the tree would offer no discrimination between object classes, i.e. the remaining layers would tend to be uniform in nature. The above described method of generating a vocabulary tree advantageously overcomes this problem by implementing a bottom-up tree generation process in which the upper layers of the vocabulary tree generated from the visual words that form the final layer of the tree. Due to the fact that the vocabulary tree is developed using a bottom-up approach without knowledge of the distribution of visual words in the feature space, the number of child nodes associated with each parent tends not to be consistent and also depends on the uniqueness and distribution of the codebook.

K-nearest neighbour (KNN) classifiers usually provide relatively good classification results when used in a visual-bag-of-words system. KNN classifiers work by calculating the distances between a test descriptor and the codebook. The codebook is then ordered in terms of closeness in feature space, and the top K matches are used to associate a class with the test descriptor. The test descriptor is associated to the class that is most predominant in the top K matches.

Such methods typically require computing distances between test descriptors and each visual-word in the codebook. As codebooks increase in size, the computation time spent on these calculations increases and if the application is for an on-line, real time, system a time lag may ensue, thereby reducing the efficiency of the classification system. The above described tree structure for classification advantageously tends to provide that the number of computations used in a classification process is reduced. In particular, as a test descriptor is propagated down through the vocabulary tree, visual-words in the other sections/branches of the tree are ignored. Thus, corresponding computations are not performed.

A further advantage provided by using the above described tree structure for classification is that techniques such as "scoring" can be implemented. Such techniques tend to allow for the assessment of the discriminative nature of visual-words.

After a descriptor from the test dataset is propagated through the tree and associated with a visual word, the score is determined to give us a measure of how well the association actually is. This will depend on its locality as well as how discriminative the visual word actually is.

Conventionally generated vocabulary trees implemented for use in text retrieval commonly use a scoring technique known as term-frequency inverse-document-frequency to determine whether the results are satisfactory.

However, it is not beneficial to map such a scheme to a vocabulary tree for which the codewords have been determined using a supervised learning technique. Adapting conventional score weightings for use with a supervised clustering technique turns not to be beneficial because it is desired that the random placement and size of objects in a scene should not impact the weight of a descriptor.

What will now be described is an optional additional weighting scheme used in this embodiment that advantageously tends to overcome or alleviates the aforementioned problems. This weighting scheme reflects both the discriminative nature of the vocabulary tree and the closeness of the match between a test descriptor and a small selection of visual-words.

In this embodiment, the visual words of a test descriptor are scored using the following expression:

$$Sc(d, q_i) = w_i \left[\frac{d_2}{d_1}\right]^2$$

where: d is the descriptor extracted from the test image;
$q_i$ is the visual word that the test descriptor is closest to in the final layer of the tree; and
$w_i$ are the associated visual-word and its respective weight; and
$d_1$; $d_2$ are the lowest two weighted distances between d and the remaining visual-words in the node.

The above described hierarchical agglomerative clustering tree and the scoring function Sc has an advantage over exhaustive search methods in that non-discriminative visual words can be identified and given a lower weighting wi. The scoring function is used once the test descriptor is associated with a visual word in the final layer of the tree, and the scoring function gives a score based on the scoring equation above—if this score is greater than a certain threshold, then the classification is used else the classification is left as "unknown".

The lower weighting described is of w, which is derived empirically. Higher weighted words are more discriminative for an object class and are therefore more desirable. Since the score is a combination of this weight and a distance ratio, it is possible to use a descriptor which is associated to a visual word of low weight, if it is extremely close to it.

This scoring method tends to weight descriptors corresponding to relatively higher $$\left[\frac{d_2}{d_1}\right]$$

ratios to a larger degree as the ratio is squared, i.e. more strongly than those with relatively lower $$\left[\frac{d_2}{d_1}\right]$$

ratios. This advantageously tends to effectively filter out poor matching results. In this embodiment, filtering is just performed with thresholding but other methods can be used.

An advantage provided by performing classification using the above described vocabulary tree is that it tends to outperform classification methods that solely use colour descriptors, or solely use non-colour descriptors (e.g. grey-scale SIFT descriptors).

A further advantage is that the above described enhanced feature vectors provides invariance to scale, rotation, and occlusion, while also containing information describing the colour of a local region. Moreover, this tends to be provided in a vector of relatively low dimension. The enhanced descriptor vectors in this embodiment have 164 dimensions, whereas conventional methodologies have a much greater number of dimensions, e.g. the colour extension to the Pyramid Histogram of Words (CPHOW) produces 384-dimensional vectors. Thus, the above described classification process tends to be more computationally efficient than conventional methods.

A further advantage is that the use of the SIFT feature descriptors in the enhanced descriptor vectors tends to compensate for the joint histogram descriptor vectors not being scale invariant. This tends to reduce problems caused by the joint histogram descriptor vectors not being scale invariant in certain situations, for example when tracking a feature from one image to the next.

A further advantage is that the use of the joint histogram feature descriptors in the enhanced descriptor vectors tends to compensate for the SIFT descriptor vectors not representing colour or texture information.

An advantage provided by the use of K-means clustering algorithm is that the number of enhanced descriptor vectors produced during the above described training process tends to be condensed into a smaller number of codewords. This tends to provide that the above described object classification process is more computationally efficient than methods that do not implement such a reduction of codeword vectors.

It should be noted that certain of the process steps depicted in the flowcharts of FIGS. 3 and 4 and described above may be omitted or such process steps may be performed in differing order to that presented above and shown in the Figures. Furthermore, although all the process steps have, for convenience and ease of understanding, been depicted as discrete temporally-sequential steps, nevertheless some of the process steps may in fact be performed simultaneously or at least overlapping to some extent temporally.

In the above embodiments, the images are of an urban scene. However, in other embodiments, one or more images in the training set of images, and/or the test images, is of a different scene. For example, in other embodiments the images are of an indoor scene. Also, in other embodiments, the above described process may be used to classify the presence of a particular class of object or phenomenon (e.g. classify the presence of smoke in an image to facilitate fire/smoke detection).

In the above embodiments, the images are captured using a visible light camera. However, in other embodiments one or more of the images in the training set of images, and/or the test images, is captured using a different type of sensor. For example, in other embodiments infrared images (e.g. images captured using an infrared camera), sonar or radar images (e.g. images captured using a sonar/radar), or 3D images (e.g. images captured using a laser range finder) are used. In another embodiment, images from more than one sensor type are used.

In the above embodiments, the images comprise objects that are to be classified as sky, buildings, trees, or roads. However, in other embodiments images may comprise different types of objects instead of or in addition those in the above embodiments. Also, in other embodiments, there are a different number of classes instead of or in addition the classes of sky, building, tree, and road.

In the above embodiments, the SIFT descriptor vector has 128 dimensions. However, in other embodiments the SIFT descriptor vector has a different number of dimensions.

In the above embodiments, the window size of the joint histogram used to generate the joint histogram descriptor vector is 18×18 pixels. However, in other embodiments the window size of the joint histogram used to generate the joint histogram descriptor vector is a different value. Preferably, the window size is between 9×9 pixels and 22×22 pixels. More preferably, the window size is equal to 18×18 pixels or 22×22 pixels.

In the above embodiments, the resolution of the joint histogram used to generate the joint histogram descriptor vector is 6 bins. However, in other embodiments the resolution of the joint histogram used to generate the joint histogram descriptor vector is a different value. Preferably, the resolution is between 6 and 12 bins. More preferably, the window size is equal to 6 or 8 bins.

A window size of the joint histogram equal to 22×22 pixels in combination with a resolution equal to 8 is the preferred value in this embodiment, as it tends to work particularly well for object classification, though other embodiments use other values.

In the above embodiments, a K-means clustering process is performed to condense the enhanced descriptor vectors generated from the set of training images into a relatively small number of codewords. However, in other embodiments a different process is implemented to achieve this, for example a hierarchical K-means algorithm, or mean-shift algorithm. Also, in other embodiments no such process is performed and each of the enhanced descriptor vectors generated from the set of training images is considered to be a codeword.

In the above embodiments a Joint Histogram descriptor vector is determined for the keypoints extracted from an image, as described above. However, in other embodiments one or more of the Joint Histogram descriptors is determined in a different way to that described above, and/or one or more of the Joint histogram descriptors is processed in a different way to that described above.

For example, in other embodiments the histogram values are weighted by the saturation, as described in "*Coloring local feature extraction*", van de Weijer, J. and Schmid, C. (2006), In Leonardis A., Bischof, H., and Pinz, A., editors, Computer Vision ECCV 2006, volume 3952 of Lecture Notes in Computer Science, pages 334-348, Springer Berlin/Heidelberg, which is incorporated herein by reference. This advantageously tends to correct errors resulting from low saturation values. Such low saturation values tend to give rise to uncertain hue values. At these low saturation values, small changes in the sensor readings tend to produce relatively large changes in the output values during the transformation to the HSV colour-space. The weighting of the histogram values of the Joint histogram may be carried out using values of saturation, saturation$^2$, $\sqrt{saturation}$, or some other function of the saturation.

In the above embodiments, the Joint Histogram is specifies values indicative of the hue in a portion of the image. When generating a joint histogram, use of this hue channel tends to provide a number of advantages over the RGB colour-space as it allows a particular colour to be placed into a discrete bin. However, the hue channel is circular in nature and tends not to correlate well with the visible light portion of the electromagnetic spectrum. In other words, typically an extreme colour (e.g. red) is both at the start and end of the hue channel when it is mapped into one dimension. In other embodiments, this problem is addressed by "wrapping" a portion of the extreme end of the hue channel back to the start. The amount of the hue channel that is wrapped may be determined empirically. A wrapped hue scale tends to advantageously reduce the amount of repetition in the hue-scale, and group together primary colours to a greater extent than the original hue scale. This advantageously tends to reduce the sensitivity to small changes in wavelength that occur in the centre of the primary colours. This may be achieved through the redistribution of hue levels via the following modulus function:

$$hue = mod(hue_{original} + C, 1)$$

where $0 < hue_{original} < 1$, and C is the proportion of the hue channel to be wrapped.

In the above embodiments, converting the enhanced descriptor vector into a set of codewords is carried out using a K-means clustering process that is performed over all the enhanced descriptor vectors by splitting the test data into groups based on class. These class-split data are then clustered in series. Codewords are then defined as the centres of the learned clusters. However, in other embodiments an alternative approach is used, for example a higher degree of supervision may be used to cluster each class separately. This may be performed so that each cluster is uniform in nature. The use of this higher degree of supervision tends to produce improved classification capabilities. In other words, supervised codebook generation tends to provide greater classification efficiency. However, supervised codebook generation may also lead to overlapping visual words if they are not discriminative in nature.

In the above embodiments the enhanced descriptor vector is formed by concatenating a SIFT descriptor vector and a Joint Histogram descriptor vector for each keypoint. However, in other embodiments the SIFT descriptor vector and a Joint Histogram descriptor vector may be relatively weighted when they are concatenated. For example, the SIFT descriptor vector and a Joint Histogram descriptor vector may be relatively weighted as described in "*Coloring local feature extraction*", van de Weijer, J. and Schmid, C. (2006), In Leonardis A., Bischof, H., and Pinz, A., editors, Computer Vision ECCV 2006, volume 3952 of Lecture Notes in Computer Science, pages 334-348, Springer Berlin/Heidelberg, which is incorporated herein by reference.

In other embodiments, a weighted distance function is used to allow the influence of the joint histogram in the enhanced descriptor vector to be varied. This allows the influence of colour and texture to be increased or decreased, which is particularly useful for classes with unique colours and textures.

For example, in other embodiment, firstly the SIFT and Joint Histogram portions of the enhanced descriptor vector are normalised to produce unit vectors to facilitate comparison between two descriptor vectors, i.e.:

$$EDV = \left(\frac{S}{|S|}, \frac{J}{|J|}\right) = (\hat{S}, \hat{J})$$

where EDV is the normalised enhanced descriptor vector, S is the SIFT descriptor vector, and J is the joint histogram descriptor vector.

To compare two normalised enhanced descriptor vectors, the distance between those two normalised enhanced descriptor vectors is calculated in feature space. This is done by weighting the Euclidean distances of the different sections of the vectors according to a scalar weight, A, that ranges between zero and one, i.e.

$$d(EDV_1, EDV_2) = (1-\lambda)\|\hat{S}_1 - \hat{S}_2\| + \lambda\|\hat{J}_1 - \hat{J}_2\|$$

The weighting of the joint histogram λ, can be varied by the user to alter the influence of colour and texture upon the enhanced descriptor and its classification effectiveness. The value of the scalar weight, λ, that ranges between zero and one is between 0 and 1. Preferably, λ is between 0.1 and 0.4. More preferably, λ is substantially equal to 0.2.

In the above embodiments, at step s28 a score value for the ith vocabulary tree is determined that is indicative of how well a vocabulary tree is able to associate identical descriptors together. This score value is calculated using the following expression:

$$score_i = 0.6(100 - c_i) + 0.3\mu_i + 0.1\sigma_i$$

where c is the percentage of correct associations, µ is the average number of computations and σ is the standard deviation of the number of computations. The score value is developed by building a tree with specific parameters and propagating the codebook into it. Since the final layer is the codebook itself, a well built vocabulary tree will associate the codewords with themselves with a small amount of computations.

However, in other embodiments, how well a vocabulary tree is able to associate identical descriptors together is assessed in a different way, e.g. by calculating a different function. For example in other embodiments, the terms $(100-c_i)$, $\mu_i$, and $\sigma_i$ in the equation above are weighted differently. In other embodiments, other parameters are used instead of or in addition to those disclosed above. For example in other embodiments, any of the parameters $c_i$, $\mu_i$, and $\sigma_i$ are taken into account. In other embodiments, the generated vocabulary trees are ranked, e.g. using a different type of score function, depending on a different type of performance metric (e.g. solely on how quickly test descriptors are classified, or solely on how accurately test descriptors are classified).

In the above embodiments, in the method of FIG. 4, the steps s22 to s30 are iterated until a vocabulary tree for each combination of the parameter values of $d_i$ and $k_i$ ($d_i=1, \ldots, 5$ and $k_i=1, \ldots, 6$) is generated and scored. In other words, in the above embodiments, thirty different vocabulary trees, each with $d_i=1, 2, 3, 4,$ or 5, and with $k_i=1, 2, 3, 4, 5,$ or 6, are generated and rated on their efficiency. However, in other embodiments a different number of vocabulary trees is generated and scored. Also, in other embodiments a generated vocabulary tree may have any value for $d_i$ and $k_i$.

In the above embodiments, the visual words of a test descriptor are weighted using the following formula:

$$Sc(d, q_i) = w_i\left[\frac{d_2}{d_1}\right]^2$$

The weighting of the visual words allows us to know whether they are actually indicative of the object class. This is done by taking the training descriptors and propagating it through the tree and analysing the class of the visual word to which it is associated. A histogram is developed for each visual word and the classes of the descriptors that were associated with it. The weight is therefore the proportion of correct class associations. High weights indicate that the visual word was discriminative in nature, while low weights indicate that the word probably exists in different classes and should not be used during classification.

Thus, more strongly weighted test descriptors may be used to describe an image. However, in other embodiments, test descriptors are not weighted. In still other embodiments, test descriptors are weighted using a different appropriate metric.

The invention claimed is:

1. A method for classifying objects from one or more images comprising the steps of:
    generating a trained classification process; and
    using the trained classification process to classify objects in said one or more images;
    wherein generating the trained classification process comprises the steps of:
        extracting features from one or more training images and clustering said features into one or more groups of features termed visual words;
        storing data for each of said visual words, including colour and texture information, as descriptor vectors;
        clustering the descriptor vectors into a plurality of clusters termed codewords;
        generating a plurality of candidate vocabulary trees using a plurality of the codewords, each candidate vocabulary tree being generated by repeatedly clustering that plurality of codewords;
        determining, for each candidate vocabulary tree, a score value indicative of how well that candidate vocabulary tree classifies as itself each of the plurality of codewords from which that candidate vocabulary tree was generated; and
        selecting, from the plurality of candidate vocabulary trees, based on the score values, a vocabulary tree, the selected vocabulary tree storing clusters of visual words with common characteristics;

and wherein using the trained classification process to classify objects in said one or more images comprises the steps of:

extracting features from said one or more images and clustering said features into groups of features termed visual words;

searching the selected vocabulary tree to determine the closest matching clusters of visual words; and classifying objects based on the closest matching clusters of visual words in the selected vocabulary tree.

2. A method for classifying objects according to claim 1, wherein one or more of the descriptor vectors comprises a combination of a concatenated Joint Histogram descriptor vector and a SIFT descriptor vector.

3. A method for classifying objects according to claim 1, wherein clustering the descriptor vectors into a plurality of clusters termed codewords comprises k-means clustering the descriptor vectors.

4. Apparatus for performing a method as claimed in claim 1.

5. A non-transitory computer readable storage medium including computer program code for use in performing a method as claimed in claim 1.

6. A method for classifying objects according to claim 1, wherein each vocabulary tree is formed agglomeratively via supervised learning.

\* \* \* \* \*